(12) United States Patent
Ushiku

(10) Patent No.: US 8,237,960 B2
(45) Date of Patent: Aug. 7, 2012

(54) TRANSMISSION OF IMAGE DATA FORMAT CONVERSION SOFTWARE ALONG WITH IMAGE DATA

(75) Inventor: Toru Ushiku, Tokyo (JP)

(73) Assignee: Canon Kabushiki Kaisha (JP)

( * ) Notice: Subject to any disclaimer, the term of this patent is extended or adjusted under 35 U.S.C. 154(b) by 1131 days.

(21) Appl. No.: 12/101,149

(22) Filed: Apr. 11, 2008

(65) Prior Publication Data

US 2008/0252927 A1 Oct. 16, 2008

(30) Foreign Application Priority Data

Apr. 12, 2007 (JP) ................................ 2007-105032

(51) Int. Cl.
   *G06F 15/00* (2006.01)
   *G06F 3/12* (2006.01)
   *G06K 1/00* (2006.01)
(52) U.S. Cl. ...................................... 358/1.15; 358/1.14
(58) Field of Classification Search .................... 358/1.1, 358/1.15, 1.14, 1.13
   See application file for complete search history.

(56) References Cited

U.S. PATENT DOCUMENTS

| 7,068,846 B1* | 6/2006 | Yaguchi .................. 382/232 |
| 2005/0259279 A1 | 11/2005 | Ohyama et al. | |
| 2006/0058982 A1 | 3/2006 | Yamada et al. | |
| 2011/0265136 A1* | 10/2011 | Liwerant et al. ............ 725/112 |

FOREIGN PATENT DOCUMENTS

| JP | 10-083260 A | 3/1998 |
| JP | 10-187368 A | 7/1998 |
| JP | 2004-133632 A | 4/2004 |
| JP | 2005-269379 A | 9/2005 |
| JP | 2006-086893 A | 3/2006 |

OTHER PUBLICATIONS

Office Action issued Dec. 6, 2011 for corresponding JP 2007-105032.

* cited by examiner

*Primary Examiner* — Douglas Tran
(74) *Attorney, Agent, or Firm* — Rossi, Kimms & McDowell LLP

(57) ABSTRACT

An image processing apparatus that allows accumulated image data and print control data to be transferred to another image processing apparatus and that may improve user convenience. The image processing apparatus is communicatively connected to another image processing apparatus. A storage unit stores input image data in a first format. A reception unit receives from the another image processing apparatus information indicating a format of image data capable of being analyzed by the another image processing apparatus. An identification unit identifies, based on the information received by the reception unit, software for converting the image data from the first format to another format of image data capable of being analyzed by the another image processing apparatus. A transmission unit transmits the image data stored in the storage unit and the software identified at the identification unit and information indicating a location where the image data is stored in said storage unit to the another image processing apparatus.

13 Claims, 11 Drawing Sheets

TRANSMISSION OF IMAGE DATA FORMAT CONVERSION SOFTWARE ALONG WITH IMAGE DATA

BACKGROUND OF THE INVENTION

1. Field of the Invention

The present invention relates to an image processing apparatus and a method of controlling the same, and a program thereof, and more particularly, to an image processing apparatus and a method of controlling the same, and a program thereof in a print data processing system that comprises a plurality of image processing apparatuses connected to one another through a communication medium, and that provides functionality for mutually transmitting image data and control information for printing among image processing apparatuses.

2. Description of the Related Art

With recent digitization efforts in copying machines, complex machines with multiple functions have come into practical use. Such complex machines have multiple functions such as facsimile transmission/reception through scanner units and printer units or printout of the expanded PDL (Page Description Language) data transmitted from computer devices, etc.

In addition to a single function, such as a copying machine function, a facsimile function, or a PDL print function, the complex machines are configured to be operable between multiple functions including facsimile-transmission of PDL expanded images, etc.

Further, when the complex machines are connected to devices such as computers through LANs (Local Area Networks), they are configured to support functions available to such devices.

In addition, the complex machines are provided with a mass storage hard disk for accumulating image data, which allows image data, such as images read from scanners, PDL expanded images, or documents received by facsimile, to be input to the hard disk, and also allows images/documents accumulated in the hard disk to be managed as files.

Further, in addition to the image data, the complex machines can also accumulate and manage a print format in printing as well as print control data in post-print process in the hard disk together with the image/document files.

An example of the above-mentioned technology is disclosed in Japanese Laid-Open Patent Publication (Kokai) H10-187368.

Since a large capacity of image data is accumulated in the hard disk, the complex machines compress such image data in a manner that image data may be expanded at each complex machine and increased memory efficiency may be provided before saving to the hard disk, instead of accumulating the original image data such as bitmap images.

However, a problem arises when image/document files are saved to the hard disk with different compression schemes for complex machines: the image/document files cannot be expanded if image data is transferred to those complex machines with a different compression scheme, and thus the image data cannot be transferred to another complex machine.

On the other hand, another problem arises with respect to the above-mentioned print control data: print control data cannot be transferred to another complex machine because there is no guarantee that, not to mention the complex machines with a different compression scheme, even those with the same compression scheme may operate in a similar way to the complex machines with accumulated image data, depending on the implementation conditions of processing devices after printing, etc.

SUMMARY OF THE INVENTION

The present invention provides an image processing apparatus and a method of controlling the same, and a program thereof that allows accumulated image data and print control data to be transferred to another image processing apparatus and that may improve user convenience.

In a first aspect of the invention, there is provided an image processing apparatus communicatively connected to another image processing apparatus, comprising: a storage unit adapted to store input image data in a first format; a reception unit adapted to receive from the another image processing apparatus information indicating a format of image data capable of being analyzed by the another image processing apparatus; an identification unit adapted to identify, based on the information received by the reception unit, software for converting the image data from the first format to another format of image data capable of being analyzed by the another image processing apparatus; and a transmission unit adapted to transmit the image data stored in the storage unit and the software identified at the identification unit and information indicating a location where the image data is stored in said storage unit to the another image processing apparatus.

In a second aspect of the invention, there is provided a method of controlling an image processing apparatus communicatively connected to another image processing apparatus, the method comprising the steps of: storing input image data in a first format; receiving from the another image processing apparatus information indicating a format of image data capable of being analyzed by the another image processing apparatus; identifying, based on the information received in the receiving step, software for converting the image data from the first format to another format of image data capable of being analyzed by the another image processing apparatus; and transmitting the image data stored in the storing step and the software identified in the identifying step and information indicating a location where the image data is stored in said storing step to the another image processing apparatus.

In a third aspect of the invention, there is provided a program that causes a computer to implement a method of controlling an image processing apparatus communicatively connected to another image processing apparatus, the method of controlling comprising the steps of: storing input image data in a first format; receiving from the another image processing apparatus information indicating a format of image data capable of being analyzed by the another image processing apparatus; identifying, based on the information received in the receiving step, software for converting the image data from the first format to another format of image data capable of being analyzed by the another image processing apparatus; and transmitting the image data stored in the step of storing and the software identified in the step of identifying and information indicating a location where the image data is stored in said step of storing to the another image processing apparatus.

According to the invention, the accumulated image data and the print control data may be transferred to another image processing apparatus and improved user convenience may be provided.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
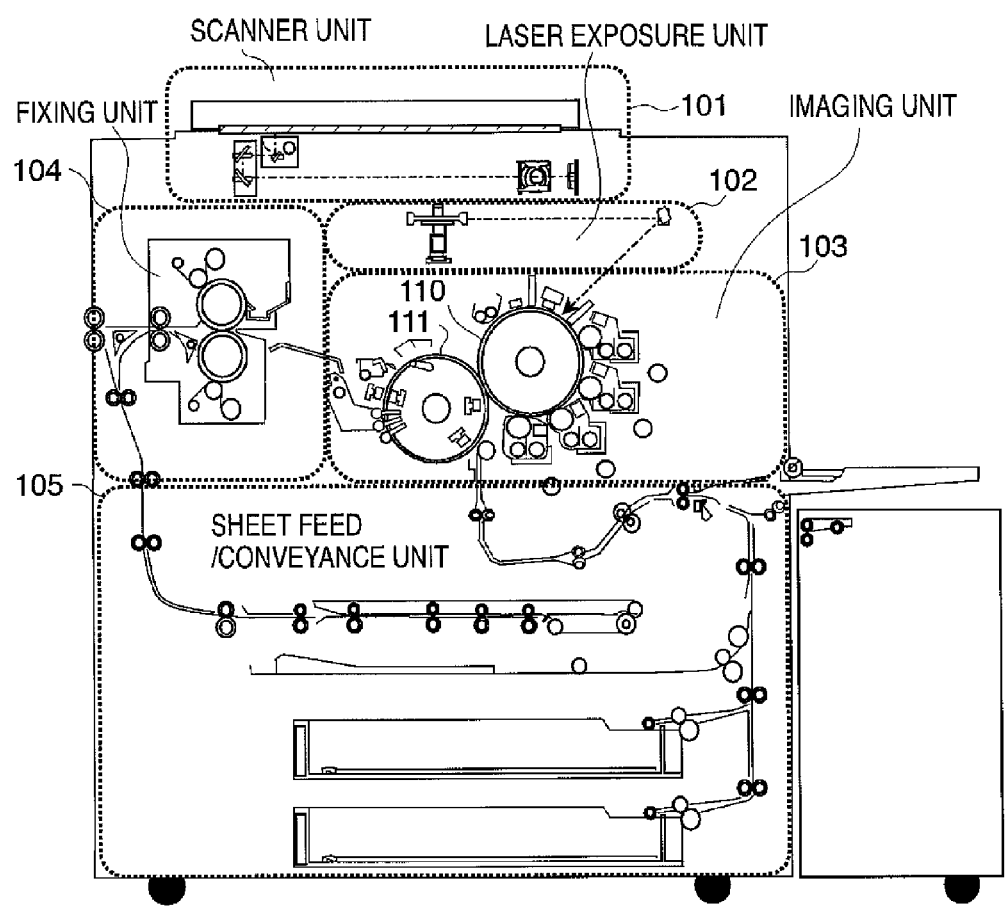
FIG. 1 is a view schematically showing an arrangement of a printing apparatus that constitutes an image processing apparatus according to an embodiment of the present invention.

FIG. 1 is a view schematically showing an arrangement of a printing apparatus that constitutes an image processing apparatus according to an embodiment of the present invention.

While, by way of example, embodiments of the present invention will be described with the image processing apparatus as a printing apparatus, the image processing apparatus may be a complex machine, a copying machine, a scanner, a facsimile, or the like. Of course, the printing apparatus is not limited to a laser beam or ink-jet printer but may be a printing apparatus with other print schemes.

In FIG. 1, the printing apparatus comprises a scanner unit 101, a laser exposure unit 102, an imaging unit 103 including a photosensitive drum 110 and a transfer drum 111, a fixing unit 104, a sheet feed/conveyance unit 105, and a printer control unit (not illustrated) controlling each of these units.

The scanner unit 101 illuminates an original placed on a platen with light to optically read an image of the original and converts the image to electrical signals to create image data.

The laser exposure unit 102 produces a beam such as a laser beam modulated depending on the image data that is incident on a rotating polygon mirror rotating at constant angular velocity and irradiated on the photosensitive drum 110 as a reflective scanning light.

The imaging unit 103 rotationally drives the photosensitive drum 110, electrifies it with an electrostatic charger, develops by toners a latent image that is formed on the photosensitive drum 110 by the laser exposure unit 102, and transfers the toner image to a sheet. Then, a series of electrophotographic processes are implemented before creating an image, including collecting residual minute toners on the photosensitive drum 110 that are not transferred during the transfer period.

At this moment, development units (development stations) with toners of magenta (M), cyan (C), yellow (Y), black (K), respectively, alternately and repeatedly implement development processes while the sheet is wound around a predetermined position in the transfer drum 111 and rotated four times thereon. After the four times of rotation, the sheet on which a full-color (four-color) toner image is transferred is separated from the transfer drum 111 and conveyed to the fixing unit 104.

The fixing unit 104, which includes a combination of a roller and a belt and provided with a heat source such as a halogen heater therein, dissolves and fixes the toners with heat and pressure on the sheet to which the toner image is transferred by the imaging unit 103.

In response to an instruction from the printer control unit, the sheet feed/conveyance unit 105, which has one or more sheet repositories represented by sheet cassettes and sheet decks, separates one sheet from those stored in the one or more sheet repositories, which is in turn conveyed to the imaging unit 103 and the fixing unit 104. In addition, when an image is created on both surfaces of the sheet, the sheet passing through the fixing unit 104 is controlled to follow a conveyance path where the fixing unit 104 is conveyed to the imaging unit 103 again.

The printer control unit communicates with a printing apparatus control unit (not shown) that controls the printing apparatus to implement control in response to an instruction provided therefrom. In addition, the printer control unit provides instructions so that the operation of entire system can be facilitated in a coordinated manner, while managing the states of the scanner unit 101, the laser exposure unit 102, the imaging unit 103, the fixing unit 104, and the sheet feed/conveyance unit 105.

Figure 2:
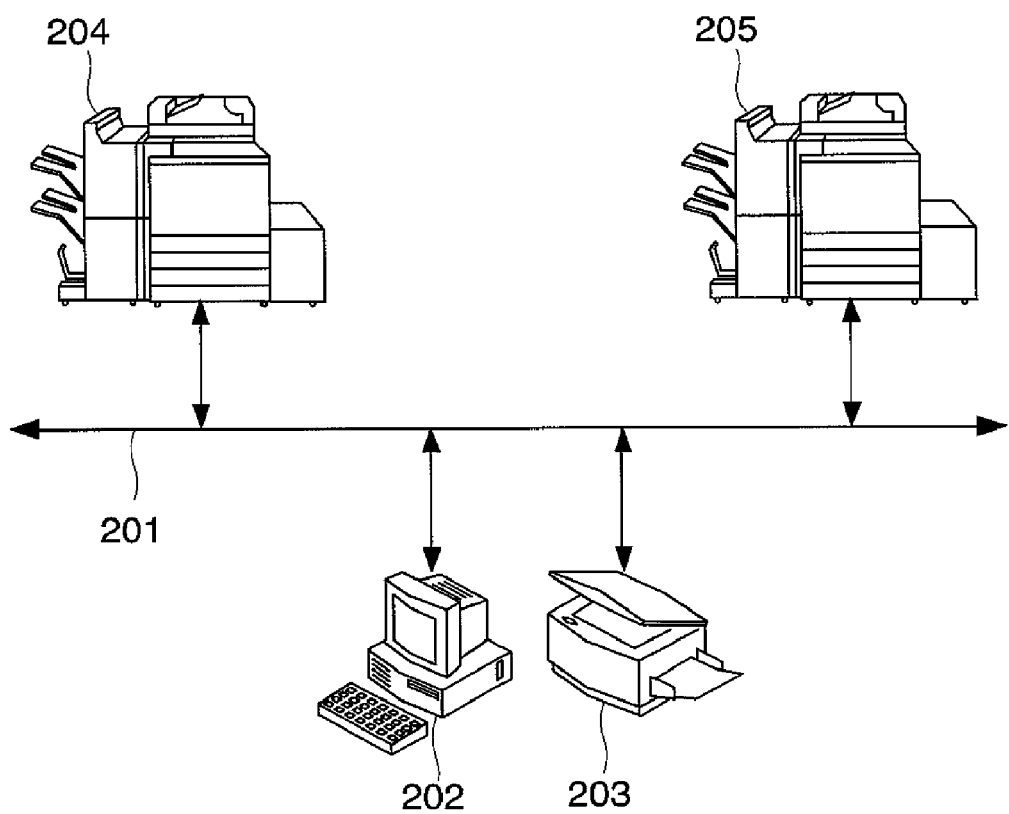
FIG. 2 is a conceptual view of a print data processing system including the printing apparatus of FIG. 1.

FIG. 2 is a conceptual view of a print data processing system including the printing apparatus of FIG. 1.

In FIG. 2, the print data processing system comprises a client host 202 and printing apparatuses (complex machines) 203-205, each connected via a respective network interface to a network 201.

The network 201 uses one of known technologies for connecting appliances, and this embodiment assumes the Ethernet (registered trademark) using the TCP/IP protocol. However, the network 201 is not limited to a wired network but may be a wireless network.

The client host 202 used by a user performs, for example, document preparation. Further, the client host 202 obtains information for, and controls, printing apparatuses 203-205 through the network 201.

Figure 3:
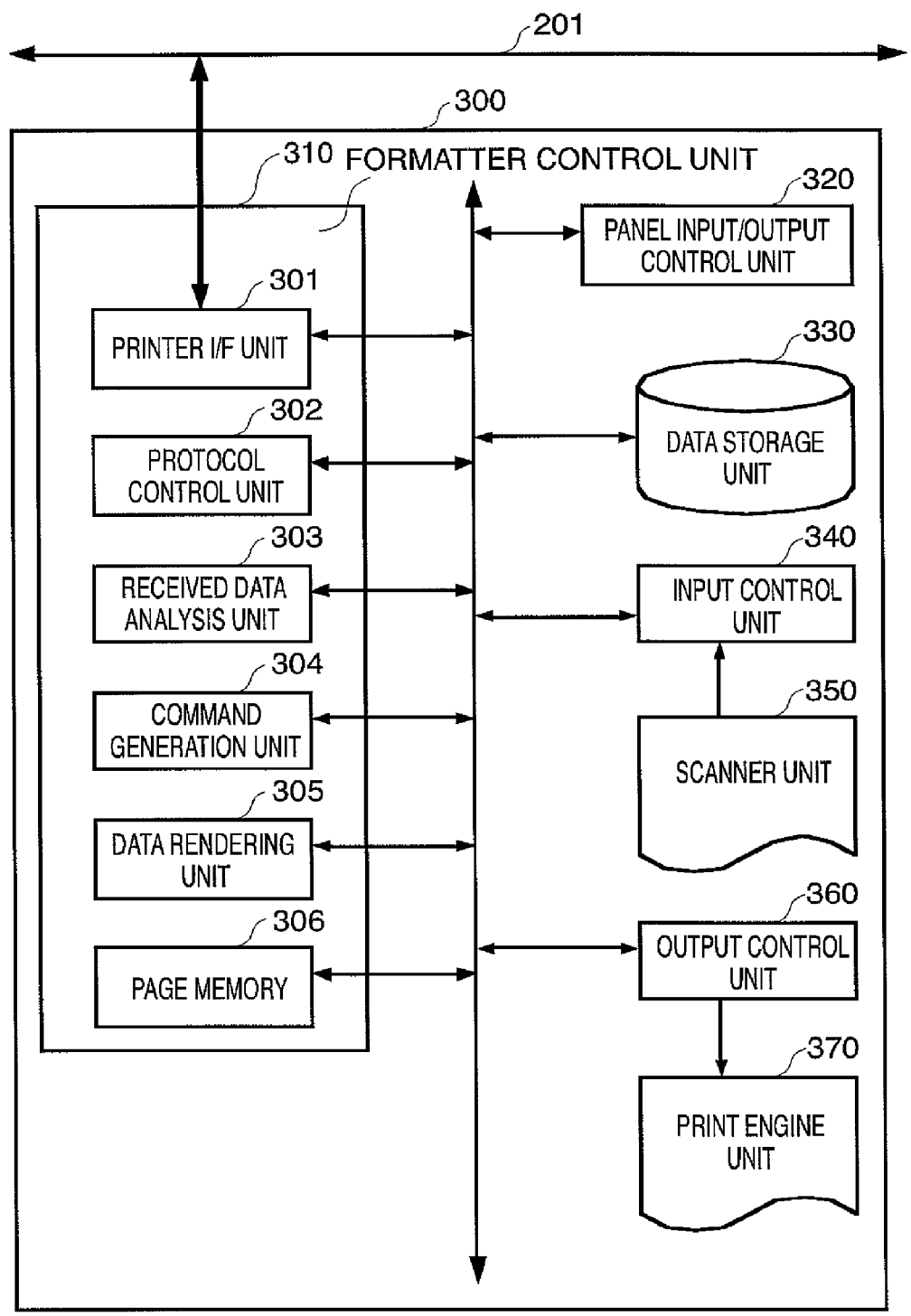
FIG. 3 is a block diagram showing an internal configuration of the printing apparatus of FIG. 1.

FIG. 3 is a block diagram showing an internal configuration of the printing apparatuses 203-205 of FIG. 2.

In FIG. 3, all these printing apparatuses 203 to 205 of FIG. 2 are collectively referred to as a printing apparatus 300. The printing apparatus 300 comprises a formatter control unit 310, a panel input/output control unit 320, a data storage unit 330, an input control unit 340, and a scanner unit 350 (the scanner unit 101 of FIG. 1). The printing apparatus 300 further comprises a print output control unit 360 and a print engine unit 370.

The formatter control unit 310 includes a printer interface (I/F) unit 301, a protocol control unit 302, a received data analysis unit 303, a command generation unit 304, a data rendering unit 305, and a page memory 306.

The printer interface (I/F) unit 301 is connected to the network 201. The protocol control unit 302 communicates with the outside by analyzing/transmitting network protocols.

The received data analysis unit 303 recognizes operations through analysis of received data. The command generation unit 304 generates operational commands in response to requests from the outside. The data rendering unit 305 generates bitmap data according to instructions of the commands. The page memory 306 accumulates bitmap data generated at the data rendering unit 305.

Besides, in general, the formatter control unit 310 is configured by a computer system using a CPU, ROM, RAM, etc.

The panel input/output control unit 320 controls inputs/outputs from an operation panel (not illustrated). The data storage unit 330, which stores received data and command data as shown in FIG. 4, is achieved by a secondary storage device such as a hard disk.

The input control unit 340 receives data input from the scanner unit 350. The scanner unit 350 reads the original. The output control unit 360 converts content of the page memory 306 to a video signal and transfers images to the print engine unit 370. The print engine unit 370 is a print mechanism for forming the received video signal on the sheet as a permanently visible image.

Figure 4:
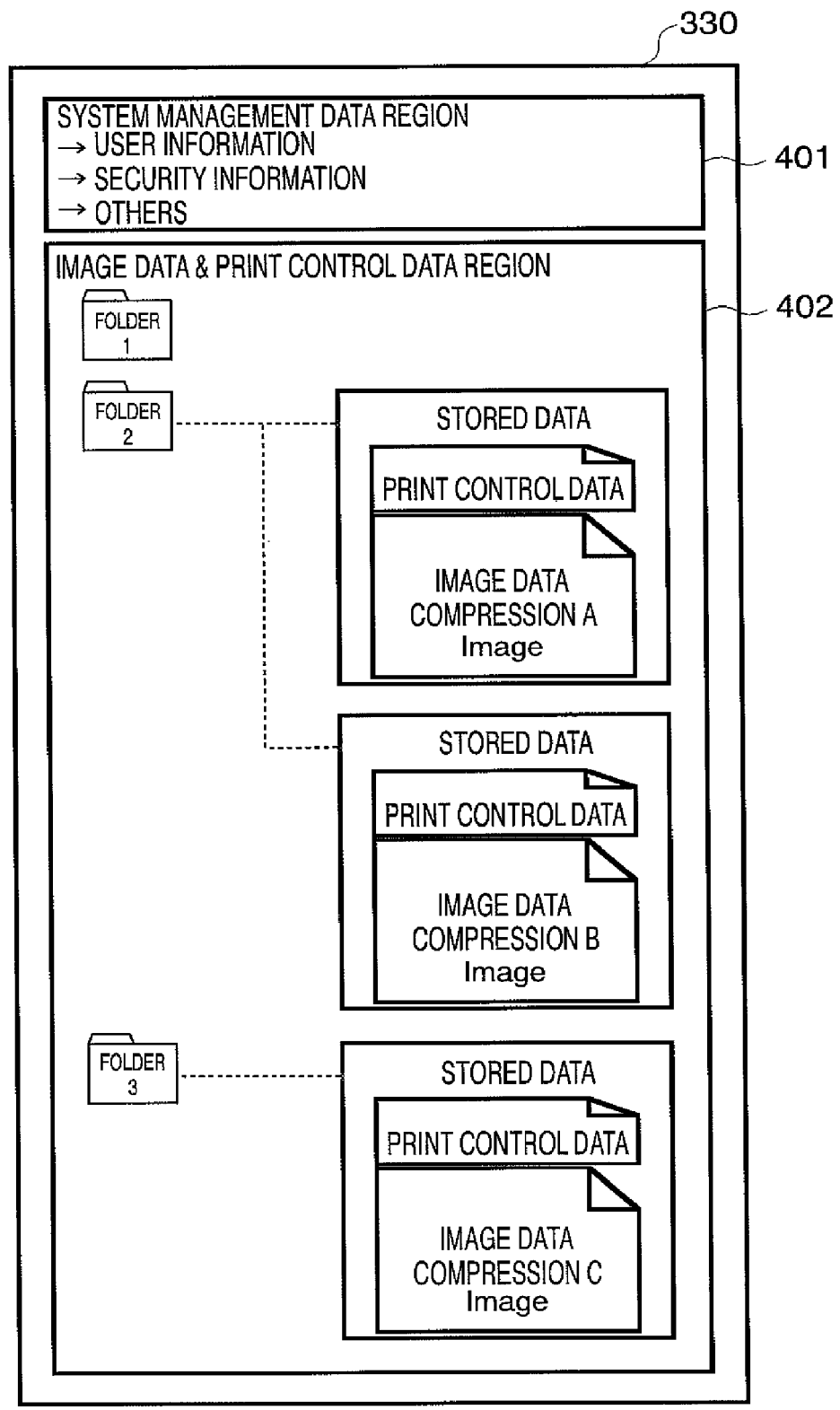
FIG. 4 is a view showing an exemplary configuration of stored data in a data storage unit of FIG. 3.

FIG. 4 is a view showing an exemplary configuration of stored data in a data storage unit 330 of FIG. 3.

FIG. 4, the data storage unit 330 has a system management data region 401 and an image data and print control data region 402.

Stored in the system management data region 401 is such data as user information or security information and system management data used in the printing apparatus 300.

Stored in the image data and print control data region 402 is such data as image data read by the scanner unit 350, PDL expanded images, or compressed image data of the document received by facsimile, as well as print control data set to output image data.

In addition, by way of example, the image data and print control data region 402 is illustrated to provide a folder structure for saving each data. In this case, the folder structure is created on the basis of such information as user information or security information in the system management data region 401.

Figure 5:
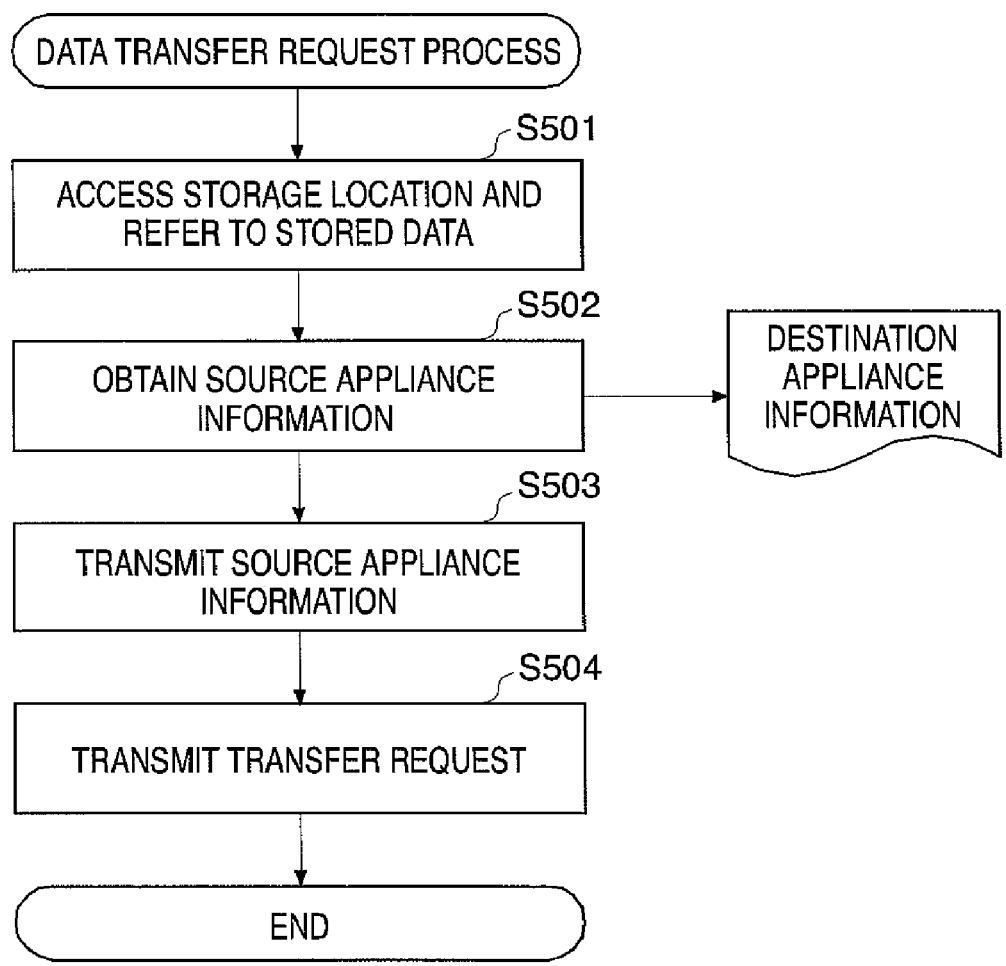
FIG. 5 is a flowchart showing a procedure of requesting data transfer by a printing apparatus (complex machine) at the receiving end in the print data processing system of FIG. 2 to another printing apparatus (complex machine) at the transmitting end.

FIG. 5 is a flowchart showing a procedure of requesting data transfer by a printing apparatus (complex machine) at the receiving end in the print data processing system of FIG. 2 to another printing apparatus (complex machine) at the transmitting end.

Firstly, in step S501, the source appliance (the printing apparatus at the receiving end) accesses the storage location (the printing apparatus at the transmitting end), in which data is stored in response to an instruction from the user, and refers to the stored data therein. As a result, a list of stored data in the data storage unit 330 of the printing apparatus at the transmitting end is displayed on a display of the source appliance, from which a user may specify the stored data to be transferred.

Then, in step S502, the source appliance information is obtained, and the destination appliance information is created. An example of the destination appliance information is labeled "1101" in FIG. 11. The destination appliance information includes the following information for the printing apparatus at the receiving end: the type of OS, the type of format of job-analyzable image data, the type of readable image data, etc. Then, in step S503, the destination appliance information created in step S502 is transmitted to the printing apparatus at the transmitting end. At step S504, a data transfer request to transfer the stored data in the data storage unit 330 of the printing apparatus at the transmitting end to the printing apparatus at the receiving end is transmitted to the printing apparatus at the transmitting end, followed by terminating the process.

Figure 6:
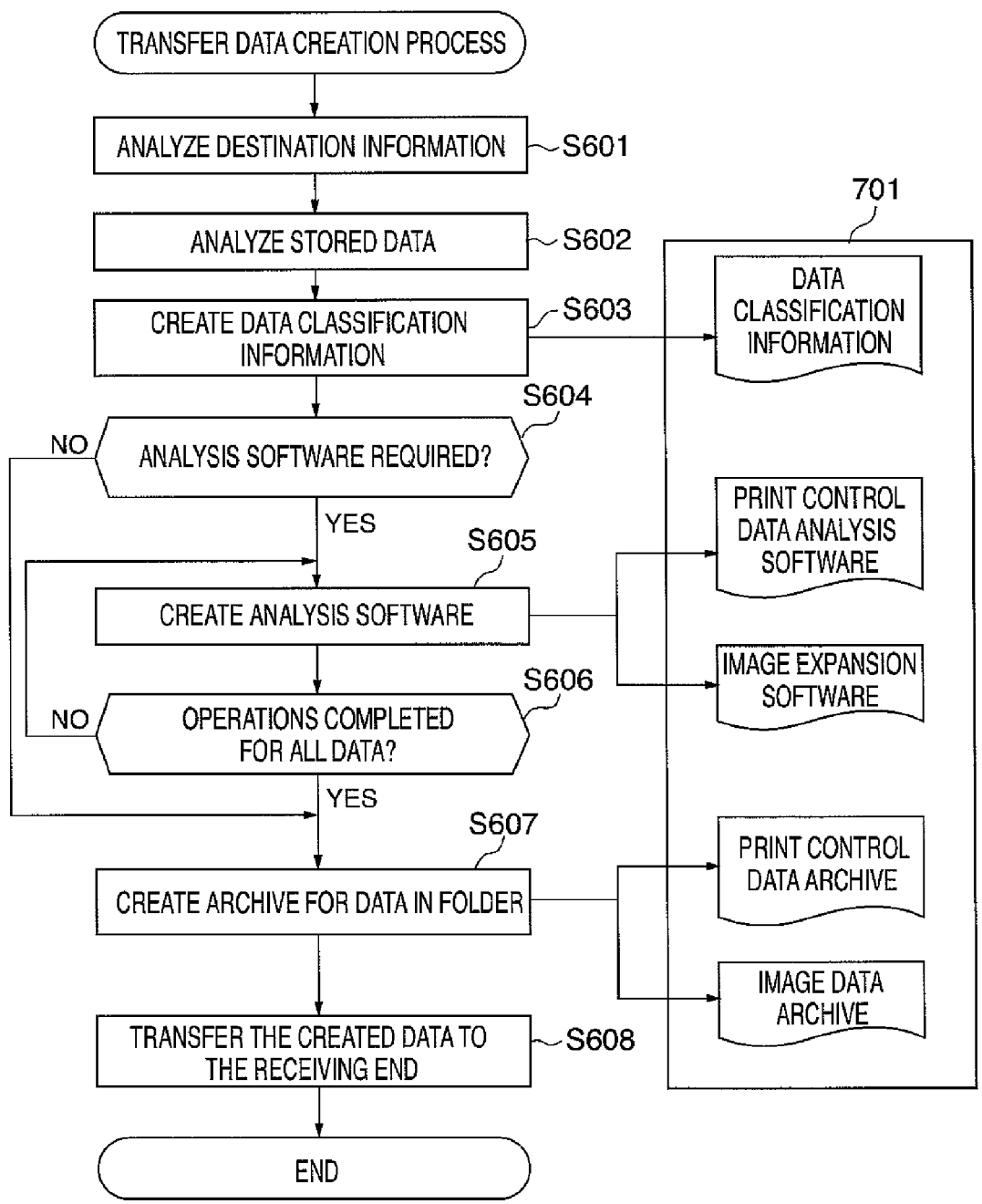
FIG. 6 is a flowchart showing a procedure of creating transfer data by the printing apparatus (complex machine) at the transmitting end in the print data processing system of FIG. 2 to the printing apparatus (complex machine) at the receiving end.

FIG. 6 is a flowchart showing a procedure of creating transfer data by the printing apparatus (complex machine) at the transmitting end in the print data processing system of FIG. 2 to the printing apparatus (complex machine) at the receiving end.

In FIG. 6, upon receipt of the data transfer request transmitted by the printing apparatus at the receiving end, in step S601, the printing apparatus at the transmitting end analyzes the received destination appliance information, and, in step S602, analyzes the stored data in the data storage unit 330. By analyzing the stored data, the stored data requested by the printing apparatus at the receiving end is identified from multiple pieces of stored data in the data storage unit 330 of the printing apparatus at the transmitting end.

Then, in step S603, based on the analysis results in step S602, data classification information is created in the image data and print control data region 402. The data classification information means such information that indicates in which folder each stored data in the data storage unit 330 is stored.

In step S604, based on the data classification information created in step S603 and the destination appliance information analyzed in step S601 (FIG. 11), a determination is made as to whether any analysis software is required for image data and print control data. The analysis software is stored in the data storage unit 330 of the printing apparatus at the receiving end, which is labeled "1102" in FIG. 11. A group of analysis software involves converting a format that may be stored in a storage unit 339 of the printing apparatus at the transmitting end to a general format. The group of analysis software is prepared for each OS.

Figure 10:
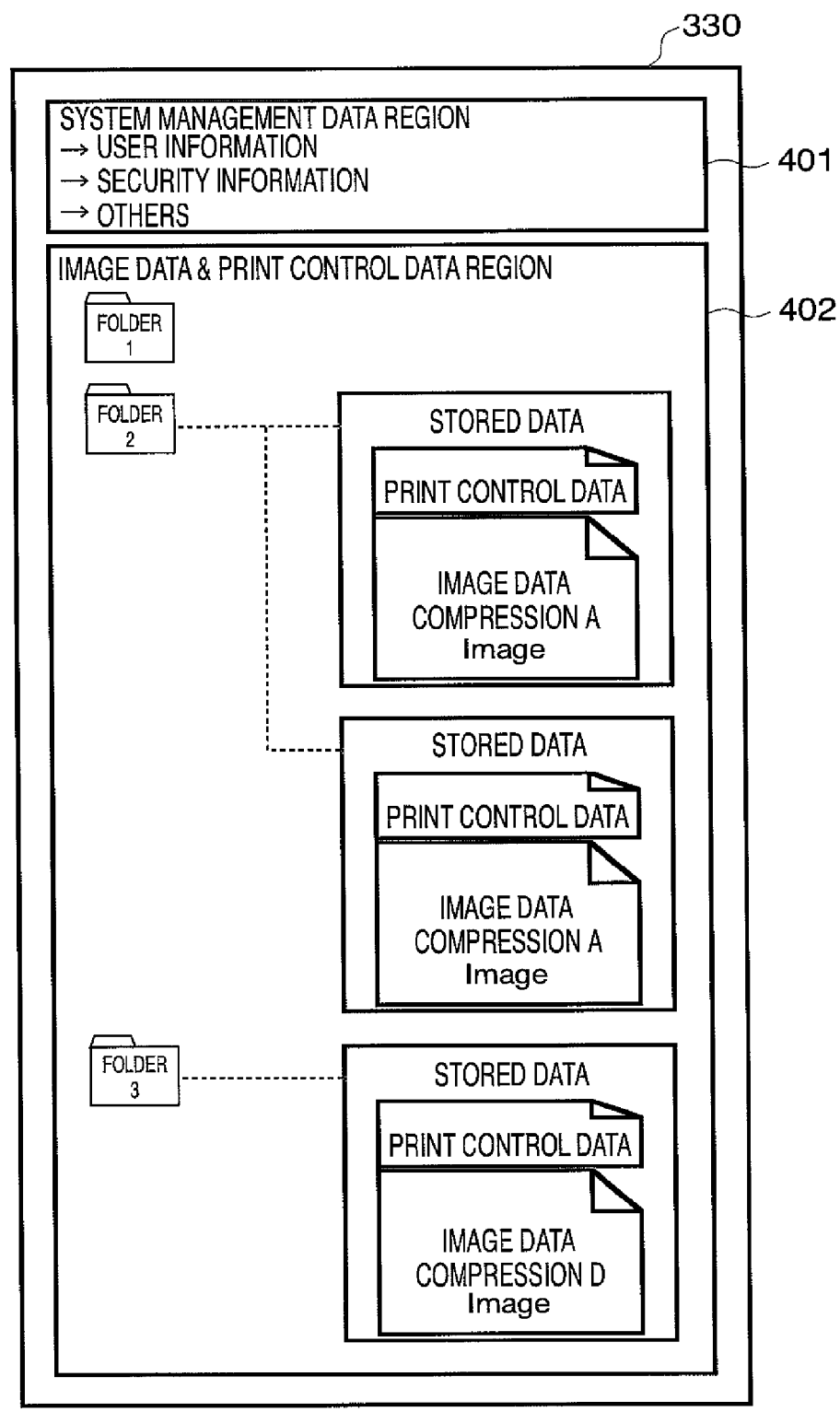
FIG. 10 is a conceptual view showing operations, starting at expansion of original data to storage thereof, when the original data is stored in a temporary folder in the data storage unit of FIG. 4.
Figure 11:
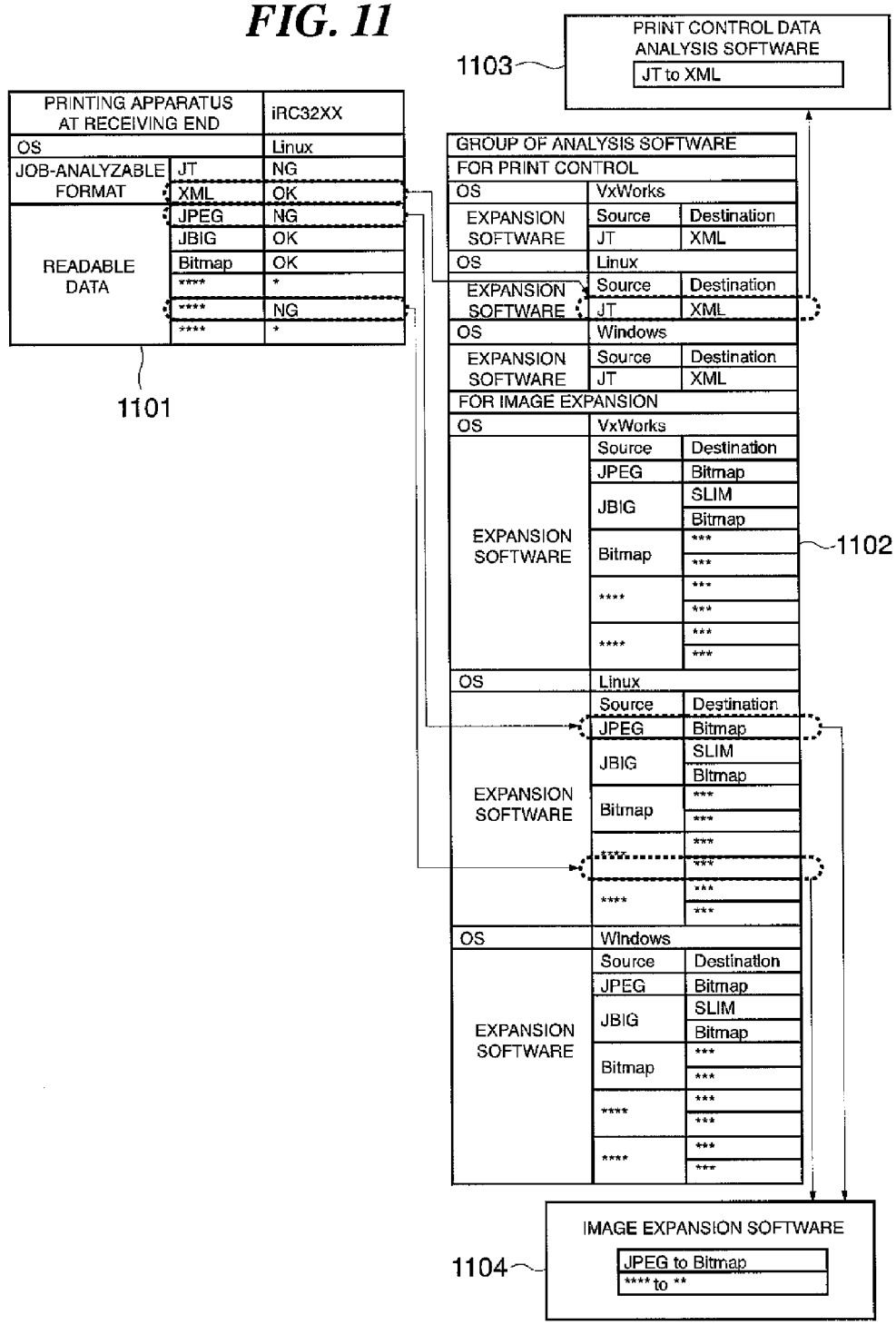
FIG. 11 is a view showing an exemplary group of analysis software stored in the data storage unit of FIG. 4.

If it is determined in step S604 that any analysis software is required, then, in step S605, analysis software is created. Specifically, the printing apparatus at the transmitting end extracts necessary analysis software from the group of analysis software 1102 in FIG. 11. Software 1103 and 1104 of FIG. 11 illustrate examples of the analysis software created in step 3605. Control data analysis software 1103 is extracted from those pieces of analysis software for print control of the group of analysis software 1102 based on the content of the job-analysis scheme in destination appliance information 1101. In addition, image expansion software 1104 is extracted from those pieces of analysis software for image expansion of the group of analysis software 1102 based on the content of readable data in the destination appliance information 1101. Upon completion of creating analysis software for all data in the image data and print control data region 402 (YES to the step S606) (FIG. 10), in step S607, an archive is created for one of those pieces of stored data in the image data and print control data region 402 that is specified by the printing apparatus at the receiving end. In the subsequent step S608, the printing apparatus at the transmitting end creates transfer data 701 including all data created in steps S603, S605 and S607, which is in turn transferred to the printing apparatus at the receiving end (FIG. 7), followed by terminating the process.

In addition, if it is determined in step S604 that no analysis software is required, then in step S607, skipping steps S605 and S606, the printing apparatus at the receiving end creates an archive for data in the image data and print control data region 402. Then, in step S608, the printing apparatus at the transmitting end transfers the transfer data 701 to the printing apparatus at the receiving end and the process terminates.

Figure 7:
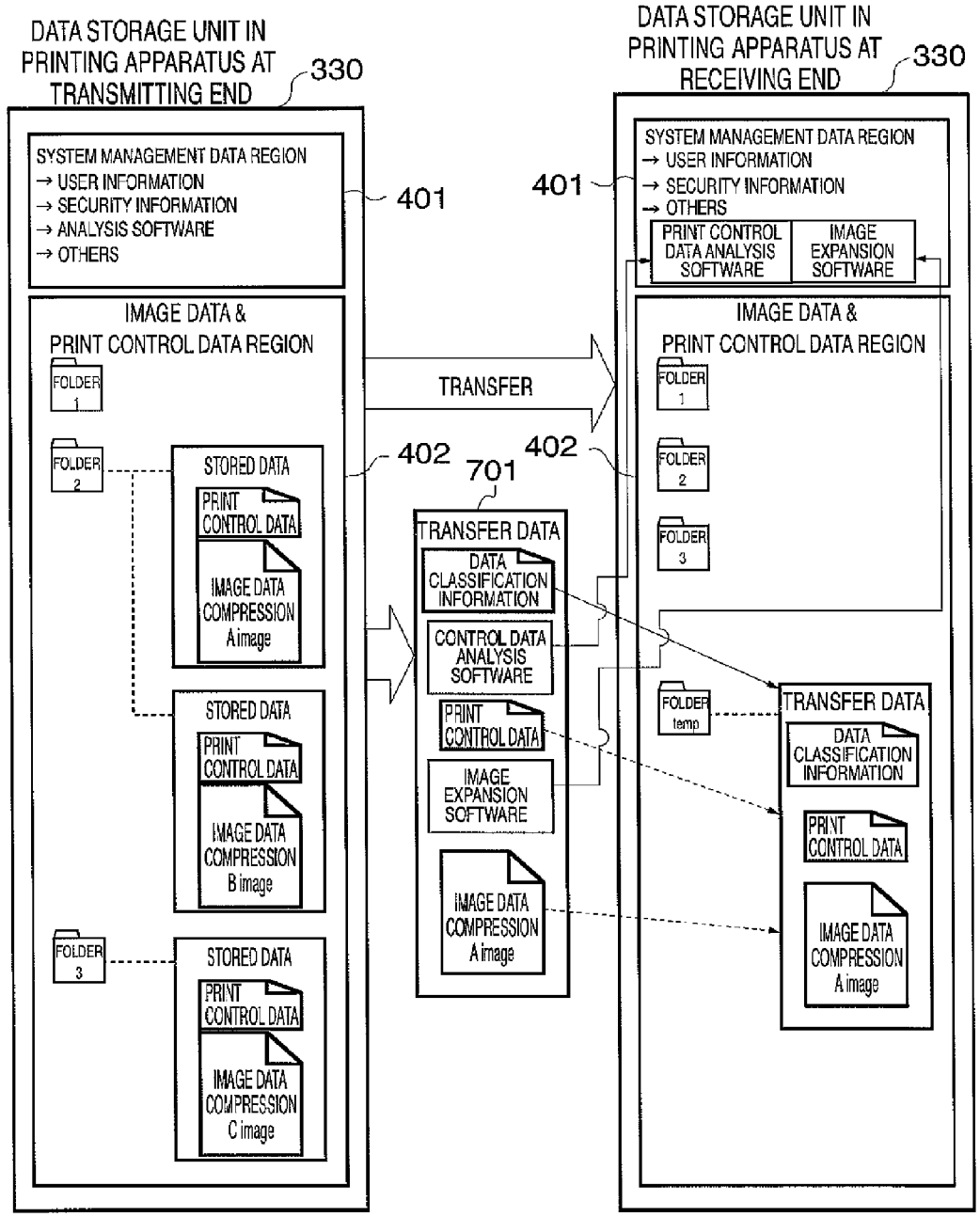
FIG. 7 is a view showing transfer concepts in an image data and print control data region in the data storage unit of FIG. 4.

FIG. 7 is a view showing transfer concepts in the image data and print control data region 402 in the data storage unit 330 of FIG. 4.

In the printing apparatus at the transmitting end, after the transfer data 701 is created based on the operations of FIG. 6, the stored data in the data storage unit 330 is transferred through the network 201 using a known technology to the printing apparatus at the receiving end.

The printing apparatus at the receiving end stores the received transfer data 701 in the data storage unit 330. In the case of FIG. 7, image data, print control data, and data classification information are stored in the image data and print control data region 402, while print control data analysis software and image expansion software are stored in the system management data region 401.

As illustrated in FIG. 7, when transfer data is stored in the printing apparatus at the receiving end, it may be stored separately in the system management data region 401 and the image data and print control data region 402, or may be stored in either the system management data region 401 or the image data and print control data region 402.

Figure 8:
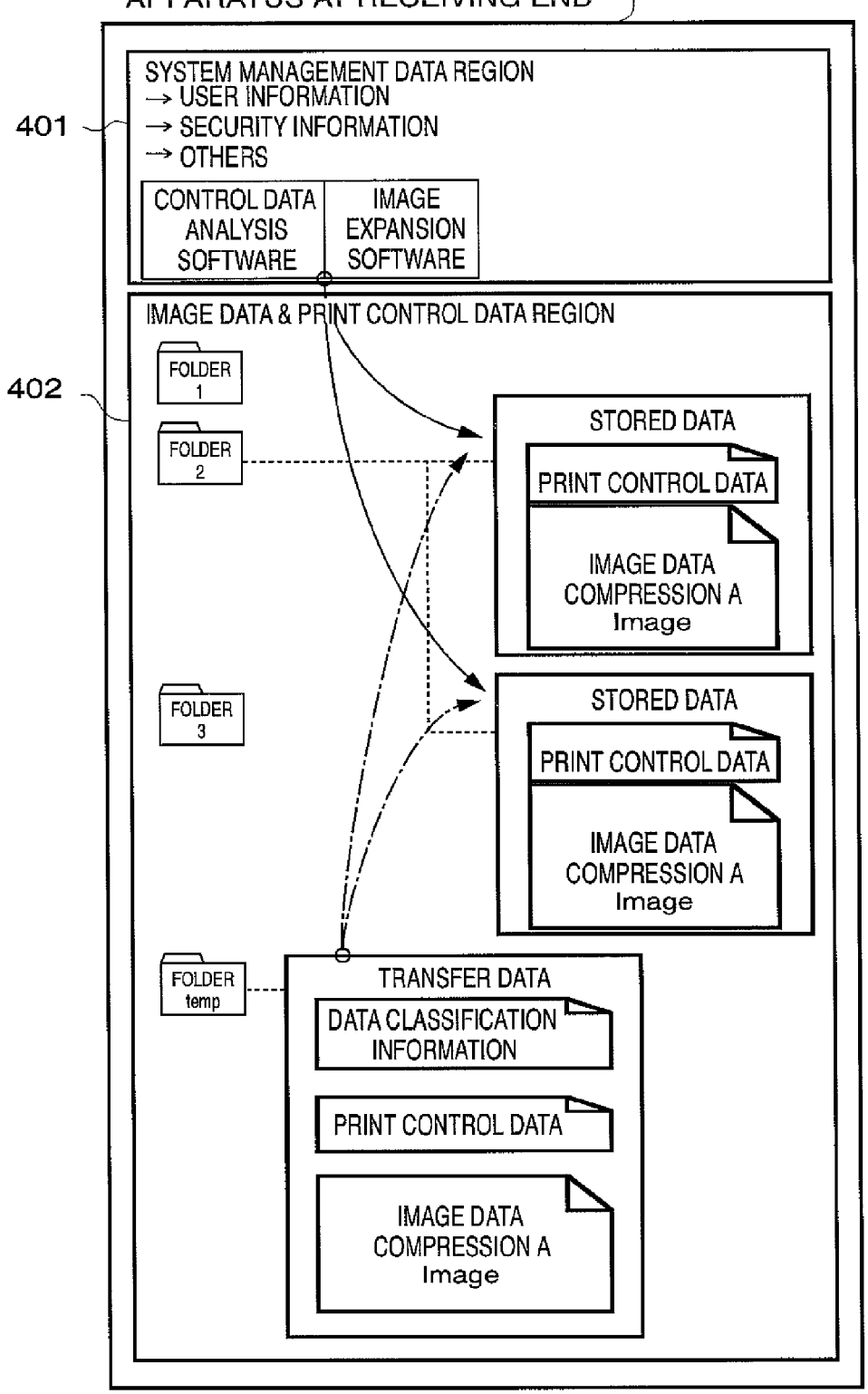
FIG. 8 is a view showing expansion concepts of the printing apparatus at the receiving end to the data storage unit of FIG. 4.

FIG. 8 is a view showing data expansion concepts of the printing apparatus at the receiving end to the data storage unit of FIG. 4.

In FIG. 8, the image data and the print control data illustrated in FIG. 7 are temporarily stored in a temporary folder. The user instructs an expansion operation to expand data in the temporary folder based on the data classification information, in the same hierarchical arrangement as stored in the data storage unit 330 of the printing apparatus at the transmitting end, using the analysis software stored in the system management data region 401. That is, the stored data in a folder with a predetermined number in the printing apparatus at the transmitting end, is stored in another folder with the same number in the printing apparatus at the receiving end (FIG. 10).

Figure 9:
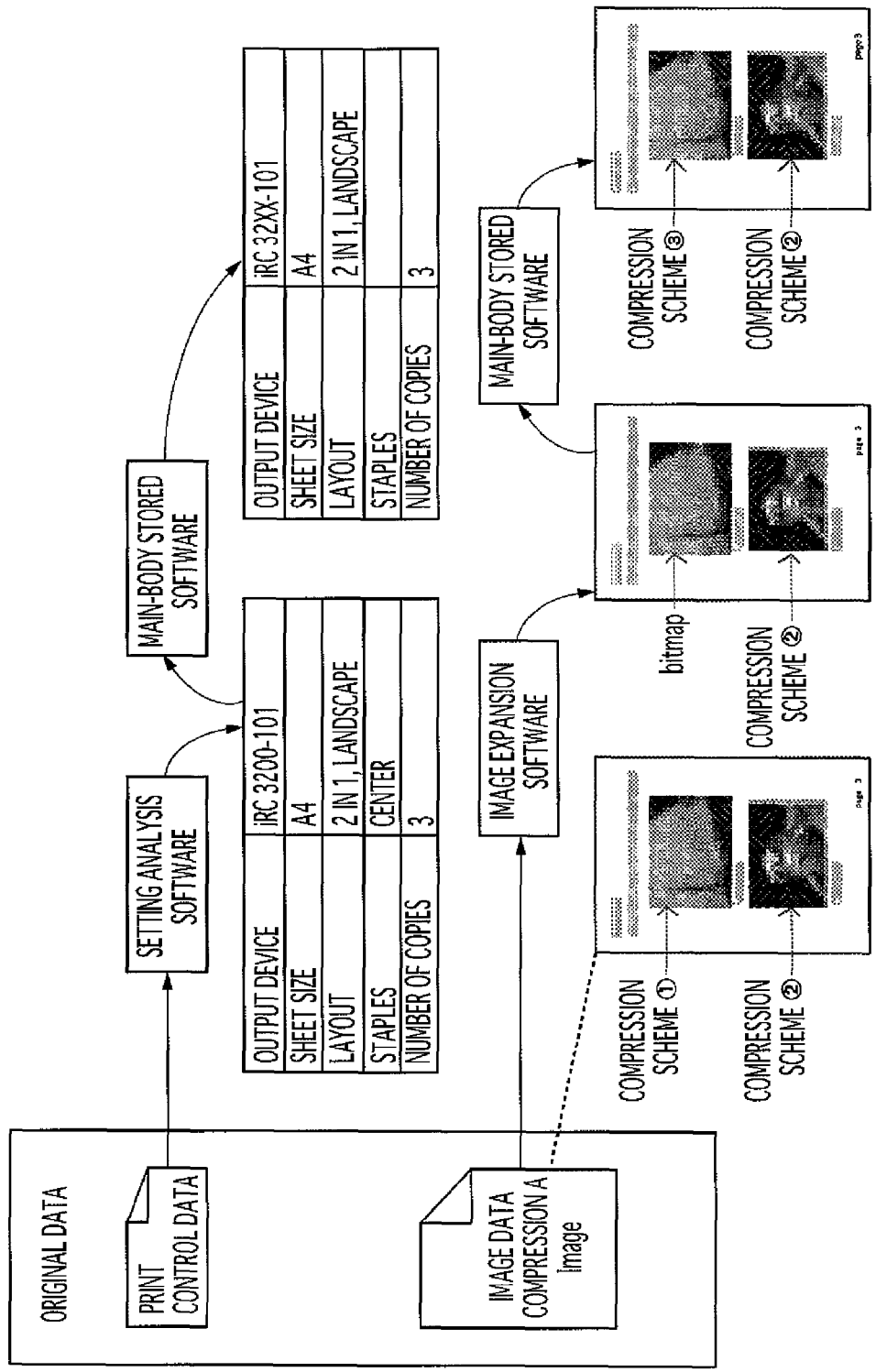
FIG. 9 is a conceptual view illustrating operations, starting at expansion of original data to storage thereof, when the original data is stored in a temporary folder in the data storage unit of FIG. 4.

FIG. 9 is a conceptual view illustrating storage operations for storing original data in the temporary folder in the data storage unit 330 of FIG. 4.

The print control data uses setting analysis software to expand the original data into such information as a corresponding output device, sheet size, layout, staples, or number of copies. In main-body stored software, the information is stored in a predetermined folder in the image data and print control data region 402 based on the analyzed information according to the format of the printing apparatus at the receiving end.

In the case of FIG. 9, since the printing apparatus at the receiving end has no stapling function, the main-body stored software deletes any operation of stapling function and stores data in the predetermined folder.

In addition, any image data that cannot be processed by the printing apparatus at the receiving end with the image expansion software is converted to a general format. Then, that image data is converted to a compressed form that can be processed by the main-body stored software. After that, the image data is stored in the predetermined folder of the image data and print control data region.

These operations may be performed at a time by an administrator at the receiving end when data is transferred, or the expansion operation may be performed in such a way that each folder is expanded sequentially when being accessed.

FIG. 10 is a view showing a state where all data to be transferred to the printing apparatus at the receiving end has been expanded in the data storage unit 330 of FIG. 4.

When all transfer data is expanded, the stored data in the temporary folder and the analysis software are erased. While all transfer data is erased in this embodiment, it may be accumulated without change. Further, for the stored data in the temporary folder, it may be erased sequentially after expanded to a predetermined folder.

FIG. 11 is a view showing a group of analysis software stored in the data storage unit 330 of FIG. 4.

In the case of FIG. 11, the group of analysis software 1102 is prepared for each OS and such software is stored therein that converts a format that can be stored in the data storage unit 330 of the printing apparatus at the transmitting end to a general format. For creation of the software, appropriate software is selected based on the destination appliance information received from the printing apparatus at the receiving end and created as analysis software 1103 and 1104.

As can be seen from the above, according to the print data processing system of FIG. 2r image data and print control data stored in one printing apparatus may be transferred to another printing apparatus in the print data processing system, which may provide improved user convenience.

It is to be understood that the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magneto-optical disk, a CD-ROM, a CD-R, a CD-RW, a DVD-ROM, a DVD-RAM, a DVD-RW, a DVD+RW, a magnetic tape, a non-volatile memory card, and a ROM. Alternatively, the program code may be downloaded via a network.

Further, it is to be understood that the functions of the above described embodiment may be accomplished not only by executing a program code read out by a computer, but also causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-105032 filed Apr. 12, 2007, which is hereby incorporated by reference herein in its entirety.

What is claimed is:

1. An image processing apparatus communicatively connected to another image processing apparatus, comprising:
    a storage unit adapted to store input image data in a first format;
    a reception unit adapted to receive from said another image processing apparatus information indicating a format of image data capable of being analyzed by said another image processing apparatus;
    an identification unit adapted to identify, based on the information received by said reception unit, software for converting the image data from the first format to another format of image data capable of being analyzed by said another image processing apparatus; and
    a transmission unit adapted to transmit the image data stored in said storage unit and the software identified at said identification unit and information indicating a location where the image data is stored in said storage unit to said another image processing apparatus.

2. An image processing apparatus as claimed in claim 1, wherein said storage unit is adapted to store multiple pieces of image data input, and said reception unit is adapted to receive from said another image processing apparatus a transfer request for image data selected from multiple pieces of image data stored in said storage unit.

3. An image processing apparatus as claimed in claim 1, wherein said storage unit is adapted to store multiple pieces of software for converting a format of image data, and said identification unit is adapted to select software, from the multiple pieces of software stored in said storage unit, for converting the first format to another format of image data capable of being analyzed by said another image processing apparatus.

4. An image processing apparatus as claimed in claim 1, wherein said storage unit is adapted to store control data for identifying the image data itself as well as how the image data is output, and said transmission unit is adapted to transmit the control data for identifying the image data itself as well as how the image data is output to said another image processing apparatus.

5. An image processing apparatus as claimed in claim 1, wherein each of said image processing apparatus and said another image processing apparatus is a copying machine, and image data stored in said storage unit is image data being read by a scanner provided at said image processing apparatus.

6. An image processing apparatus as claimed in claim 1, wherein said another image processing apparatus stores the image data transmitted by said transmission unit based on the information indicating a location where the image data is stored in said storage unit.

7. A method of controlling an image processing apparatus communicatively connected to another image processing apparatus, said method comprising the steps of:
    storing input image data in a first format;
    receiving from said another image processing apparatus information indicating a format of image data capable of being analyzed by said another image processing apparatus;
    identifying, based on the information received in said receiving step, software for converting the image data from the first format to another format of image data capable of being analyzed by said another image processing apparatus; and
    transmitting the image data stored in said storing step and the software identified in said identifying step and information indicating a location where the image data is stored in said storing step to said another image processing apparatus.

8. A method of controlling an image processing apparatus as claimed in claim 7, wherein said storing step comprises storing multiple pieces of image data input, and said receiving step comprises receiving from said another image processing apparatus a transfer request for image data selected from multiple pieces of image data stored in said step of storing.

9. A method of controlling an image processing apparatus as claimed in claim 7, wherein said storing step comprises storing multiple pieces of software for converting a format of image data, and said identifying step comprises selecting software, from the multiple pieces of software stored in said storing step, for converting the first format stored in said step of storing to another format of image data capable of being analyzed by said another image processing apparatus.

10. A method of controlling an image processing apparatus as claimed in claim 7, wherein said storing step comprises storing control data for identifying the image data itself as well as how the image data is output, and wherein said transmitting step comprises transmitting the control data for identifying the image data itself as well as how the image data is output to said another image processing apparatus.

11. A method of controlling an image processing apparatus as claimed in claim 7, wherein each of said image processing apparatus and said another image processing apparatus is a copying machine, and image data stored in said step of storing is image data being read by a scanner provided at said image processing apparatus.

12. A method of controlling an image processing apparatus as claimed in claim 7, wherein said another image processing apparatus stores the image data transmitted by said transmitting step based on the information indicating a location where the image data is stored in said storing step.

13. A non-transitory computer-readable storage medium storing a program executable by a computer to implement a method of controlling an image processing apparatus communicatively connected to another image processing apparatus,
    said controlling method comprising the steps of:
    storing input image data in a first format;
    receiving from said another image processing apparatus information indicating a format of image data capable of being analyzed by said another image processing apparatus;
    identifying, based on the information received in said receiving step, software for converting the image data from the first format to another format of image data capable of being analyzed by said another image processing apparatus; and
    transmitting the image data stored in said step of storing and the software identified in said step of identifying and information indicating a location where the image data is stored in said step of storing to said another image processing apparatus.

* * * * *